United States Patent [19]

Huck et al.

[11] Patent Number: 4,472,337

[45] Date of Patent: Sep. 18, 1984

[54] VIDEO DISC PROCESSING

[75] Inventors: Robert H. Huck, Indianapolis; Frederick R. Nyman, Carmel, both of Ind.; David A. Berry, Columbus, Ohio

[73] Assignee: RCA Corporation, New York, N.Y.

[21] Appl. No.: 91,878

[22] Filed: Nov. 7, 1979

[51] Int. Cl.$^3$ .............................................. B29D 17/00
[52] U.S. Cl. ...................................... 264/107; 15/302; 264/233
[58] Field of Search ................ 264/107, 233; 425/810; 15/302

[56] References Cited

U.S. PATENT DOCUMENTS

| | | | |
|---|---|---|---|
| 3,479,222 | 11/1969 | David | 15/302 X |
| 3,842,194 | 10/1974 | Clemens | 178/6.6 A |
| 4,032,610 | 6/1977 | Spiller | 264/107 |
| 4,113,897 | 9/1978 | Nosker | 264/107 |

OTHER PUBLICATIONS

Hi Fi Review, Nov. 1959, vol. 3, No. 5, "What You Should Know About Record Cleaners", pp. 62 et seq.

*Primary Examiner*—Donald Czaja
*Assistant Examiner*—V. Fischbach
*Attorney, Agent, or Firm*—Birgit E. Morris

[57] ABSTRACT

Video discs are cleaned with a water-based solution to remove water soluble salts from the surface of the discs, thereby reducing the moisture sensitivity of the discs.

15 Claims, No Drawings

VIDEO DISC PROCESSING

This invention relates to the manufacture of video discs. More particularly, this invention relates to the manufacture of molded, conductive video disc replicas to improve their storage stability.

BACKGROUND OF THE INVENTION

A capacitance video disc system has been described by Clemens in U.S. Pat. No. 3,842,194. The disc described comprises a plastic disc containing an information track having audio, video and color information in the form of a surface relief pattern arranged in a spiral groove on the surface of the disc which can be played back with a stylus. The video disc of Clemens had a conductive metal coating to provide the conductivity required for capacitive pickup and a thin layer of a dielectric material thereover. An electrode on the playback stylus completed the capacitor.

Improvements have been made in this system whereby the disc is made from a conductive plastic material, as disclosed by Fox et al in copending application Ser. No. 818,279, filed July 25, 1977. A polyvinylchloride based molding composition is mixed with sufficient amounts of finely divided carbon black particles so that the resulting composition has the conductivity required for capacitive playback. A thin layer of the polyvinylchloride surrounds each of the conductive carbon particles so that a thin dielectric layer is present at the surface. Improvements to the conductive molding composition are described by Martin et al in copending application Ser. No. 003,363, filed Jan. 15, 1979.

The use of a conductive plastic eliminates the need for separate metal and dielectric layers on the disc surface and thus has simplified manufacture of the disc. However, we have found the stability of these discs with respect to environmental fluctuations of temperature and relative humidity has been less than satisfactory. Discs which on initial playback have excellent playback characteristics, deteriorate with respect to playback after storage under ambient conditions. This deterioration is particularly marked when the discs are exposed to high temperature and/or high relative humidity conditions.

SUMMARY OF THE INVENTION

We have found that molded conductive video discs that have been cleaned with an aqueous solution to remove soluble salts that accumulate on the surface of the disc during storage, particularly on exposure to elevated temperature and/or elevated relative humidity, have improved playback performance.

DETAILED DESCRIPTION OF THE INVENTION

The video discs treated according to the present invention are molded from a molding composition comprising; a polymer of vinyl chloride; finely divided carbon black particles; a stabilizer system, generally a mixture of tin salts that scavenge or take up hydrochloric acid formed as a decomposition product of the vinyl chloride polymer during processing; a lubricant system, generally composed of both an internal lubricant to modify the melt viscosity of the molding composition during processing, and an external lubricant to provide release of the molded article, herein described as a video disc, from the mold; and a flow modifier system, generally composed of plasticizers and processing aids, which reduces the melt viscosity of the molding composition during processing.

When large amounts of carbon black are present in a molding composition, the melt viscosity greatly increases, necessitating higher molding temperatures or larger amounts of plasticizers and processing aids. Since the present carbon-loaded polyvinylchloride molding compositions employed for the video disc contain about 12 up to 20 percent by weight of carbon black or even higher, depending on the type of carbon black used and the dispersion obtainable, several processing aids and plasticizers must be added to obtain the melt flow properties required to compression mold the information disc, which contains information as very small surface relief patterns in a very shallow information track. Sufficient lubricants must be added to promote ready release of the molded article from the mold because any release problems will result in distortion of the record during forced release, and even distortion of the stamper from which it is molded, which ruins all succeeding discs made from the stamper.

The polyvinylchloride (PVC) resins suitable for manufacture of the video disc include polymers and copolymers of vinylchloride and mixtures thereof. In order to produce desired characteristics in the molded video discs, such as dimensional stability, the PVC resin should have a high heat distortion temperature, preferably 140° F. (60° C.) or higher. Suitable polymers include homopolymers of vinylchloride such as No. 346 resin of the B. F. Goodrich Company which has a $T_g$ of 88° C., or a vinylchloride-polypropylene copolymer known as AP480 from Air Products & Chemicals, Inc., which has a $T_g$ of 76° C. Other polyvinylchloride homopolymers such as Great American Chemical Company's 550 resin and Air Product's 2160 resin can also be employed.

Conductive particles suitable for use in the molding composition include highly electrically conductive, finely divided carbon blacks, preferably which have a low bulk density to reduce loading requirements. Presently preferred is a product of the Armak Company, Ketjenblack EC, which has an apparent bulk density of about 140–160 grams per liter and an average particle size of about 300 angstroms. Other carbon blacks can also be employed, in whole or in part, provided they meet the electrical requirements. Denser particles of carbon will generally require higher loading, e.g., up to about 35–40 percent by weight of the molding composition, to obtain an equivalent electrical conductivity. An amount of from about 12–20 percent by weight of a carbon black such as Ketjenblack EC is preferred.

From about 1.5–4 percent by weight of stabilizers are added to the chosen PVC-carbon black composition. Suitable stabilizers include organotin compounds such as dibutyltin-$\beta$-mercaptopropionate, commercially available as T-35 from M & T Chemical Company, Inc., dibutyltin maleate, commercially available as Mark 275 from Argus Chemical Company, and stabilizers such as barium-cadmium-lead stearate, commercially available as Q-232B of Argus Chemical Company. Other stabilizers are well known. Stabilizers act primarily to scavenge volatile decomposition products of the PVC resin, particularly hydrogen chloride. Preferably, a combination of more than one stabilizer in a particular molding composition is employed.

Suitable lubricants for PVC resins are well known and include fatty acids and esters of alcohols and fatty acids, soaps, fatty acid amides and the like. At least two lubricants should be employed, again, to prevent excessive bleed out of the lubricant during the molding process and to provide both internal and external lubrication. Suitable lubricants include a mixture of a monofatty acid ester of varying molecular weight alcohols and acids commercially available as Loxiol's G-30 from Henkel International GmbH, Loxiol G-70, a polyfunctional complex ester of saturated fatty acids, a room temperature solid esterified montan wax commercially available as Wax E of the Hoechst Company, calcium, zinc or lead stearates, stearic amide, oleamide, ethylene bis stearamides and the like. Sufficient lubricants must be added to prevent high shear heating during processing and to provide good release from the mold. Generally from about 1 to 3 percent by weight of the molding composition of a lubricant system will be used.

Additional modifiers including plasticizers and processing aids in amounts up to about 10 percent by weight of the resin composition are also added to improve the processing and molding characteristics of the resin composition. Suitable plasticizers include products such as chlorinated paraffin waxes, for example Unichlor 70AX from Neville Chemical Company, glyceryl tribenzoate, commercially available as Benzoflex S-404 from Velsichol Chemical Corporation, epoxidized soybean oils, commercially available as Paraflex G-62 from Rohm & Haas Company, Santicizer 711, a primary phthalate plasticizer of the Monsanto Company, Kodaflex NP10, a polymeric ester plasticizer from Eastman Chemical Products, dicyclohexylphthalate and various processing aids such as acrylic modifiers of Rohm & Haas Company commercially available as K-147 and K-175. Other modifiers are well known.

Video disc replicas are made by mixing the molding composition first as a dry blend and then heating to melt temperatures and extruding and pelletizing for storage. The discs are then compression molded in conventional manner, e.g., forming a pre-form and compression molding using a 30-60 second cycle at about 325°-380° F. (163°-190° C.) and removing the flashing.

A thin lubricant coating is usually added to the video disc. This film serves as an added dielectric layer at the surface and also serves to reduce stylus wear during playback of the disc. One lubricant type that has been employed successfully is a methylalkylsiloxane of the formula

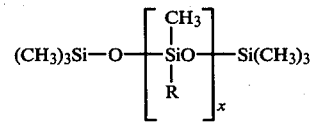

wherein R is an alkyl group of 4-20 carbon atoms and x is an integer. These lubricants can be applied by spinning or spraying from solution or evaporating onto the disc surface. An improved lubricant is a purified fractionated lubricant of the above type wherein R is 10 and x ranges from about 2-3. The purified lubricant can be made by molecular distillation of the higher molecular weight material, as is described by Wang et al in copending application Ser. No. 937,819 filed Aug. 29, 1978.

During compression molding of the video disc, many of the above additives, or reaction products of these additives including decomposition products or reaction products of the additives with the PVC or with each other, migrate to the surface of the disc where they form a thin film. This thin film is a complex mixture of various organic and inorganic materials. It is this thin film which is moisture sensitive and causes playback problems for the video disc.

When a video disc as pressed is exposed to moisture in the atmosphere, small droplets of water condense on the surface of the disc. Any salts or other water soluble materials that are present on the surface of the disc, whether under or adjacent to the water droplets, are dissolved by the water droplets. These water droplets may also dissolve water soluble materials below the surface of the disc, as by a wicking or leaching effect. When the water evaporates, the salts are left on the surface of the disc, now not as a uniform thin film, but as lumps or deposits. These deposits may be many grooves wide and they fill up the grooves beneath them as well. Thus the information present in the groove beneath the deposits is masked or lost during playback by the stylus, which rides over the deposits, resulting in a loss of signal or dropouts in that area. Additional signal losses occur because the stylus may dislodge some of these deposits during playback, and they collect beneath or in front of the stylus which results in further distortion or loss of signal. The present standard for such loss of signal, or dropouts, for acceptable video discs is about 2-3 seconds in one hour of playback time.

We have found that by washing the discs with an aqueous cleaning solution, which can be deionized water, a dilute solution of an acid such as hydrochloric acid, or a base such as an organic alcohol solution, the thin film of salts or other impurities is removed, whether by physical dislocation or dissolution, thereby greatly reducing the moisture sensitivity of the disc.

Analyses of the film on the disc surface and of solutions used to wash the discs have revealed that metal salts including calcium, barium, nickel and tin, sulphur compounds and organic compounds such as esters are present on the disc surface. Those compounds which are water soluble will be adequately treated with water or slightly acidic aqueous solutions. Addition of basic materials such as organic alcohols may be better able to remove organic contaminants. Addition of small amounts of surfactants to the aqueous wash solution may be beneficial in improving the wetting of the irregularly shaped surface of the video disc by the cleaning solution.

The discs can be cleaned by immersing in the cleaning solution, or by spraying and the like. The solution can be agitated to improve the cleaning action, as by mechanical stirring, or ultrasonic agitation and the like. A scrubbing action can also be directed at the surface of the disc if desired, to aid in the cleaning action. Multiple immersion can be employed, and a final rinse with purified water can also be beneficially employed. After cleaning, the discs may be air dried. A preferred cleaning method comprises directing jets of spray of the cleaning solution at the surfaces of the disc for about 1 to 5 minutes, immersing the discs in clean water and slowly withdrawing the discs to avoid the formation of water droplets on the surface; and air drying.

The invention will be further described in the following Examples, but it is to be understood that the invention is not meant to be limited to the details described therein. In the Examples parts and percentages are by weight unless otherwise noted.

Carrier distress time is measured by adding the amount of time in seconds (but discounting intervals of less than 10 microseconds) when the r.f. output of the player arm is less than 150 millivolts peak to peak (referenced to a 1 volt reference level) and the time when the r.f. output is above 8.6 megahertz or below 3.1 megahertz in frequency, indicating a defect. Such defects are noted by the viewer as long dropouts, up to a complete loss of picture and sound information. The present pass criterion for a video disc is a maximum of 3 seconds in 60 minutes of playback time and good quality is considered to be less than 0.3 second in 60 minutes of playback time.

EXAMPLE 1

A molding composition was prepared by mixing 74.05 part of X346 PVC resin; 15.0 parts of Ketjenblack EC; 1.5 parts of T-35 stabilizer, 1.0 part of Mark 275 stabilizer and 1.0 part of Q232B stabilizer; a lubricant system of 0.5 part of Loxiol G-30 lubricant, 0.25 part of Loxiol G-70 lubricant, 0.3 part of calcium stearate and 0.4 part of Wax E; and a modifier system including 1.0 part of G-62, 1.0 part of Benzoflex S404, 2.0 parts of Unichlor 70AX and 2.0 parts of K-175.

Video discs were compression molded at about 360° F. (182.2° C.).

About ½ of the discs molded as above were rinsed with water by dipping the discs into a container of circulating deionized water for 1 minute and then immersing in a second container of water and removing slowly so as to prevent water droplet formation on the surface. These discs were then air dried and a lubricant spray coating applied as a 1 percent solution in heptane of

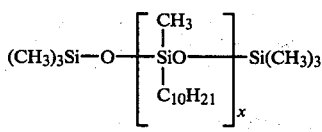

where x is about 2-3.

Both rinsed and unrinsed discs were tested for carrier distress on initial playback. The results are summarized below in Table I where the results are an average of 12 discs each.

TABLE I

| Carrier Distress Time, secs. | | % Passed, 2 secs. per side | | % Passed, 2 milli- seconds/second | |
|---|---|---|---|---|---|
| Rinsed | Un- rinsed | Rinsed | Un- rinsed | Rinsed | Un- rinsed |
| 0.5 | 0.4 | 92 | 100 | 100 | 100 |

A portion of the discs were subjected to a low temperature condensation stress test as follows: the discs were stored at 40° F. (4.4° C.) in a refrigerator for 2 hours and then removed to a room temperature chamber maintained at 70° F. (21.1° C.) and 50 percent relative humidity (hereinafter ambient temperature) and maintained for 2 hours. The results (12 discs each) are summarized below in Table II.

TABLE II

| Carrier Distress Time, secs. | | % Passed, 2 secs. per side | | % Passed, 2 milli- seconds/second | |
|---|---|---|---|---|---|
| Rinsed | Un- rinsed | Rinsed | Un- rinsed | Rinsed | Un- rinsed |
| 0.5 | 1360 | 100 | 0 | 100 | 0 |

A portion of the discs were subjected to a high temperature, high humidity condensation stress test as follows: the discs were taken from ambient room temperature conditions to a chamber maintained at 95° F. (35° C.) and 75 percent relative humidity, held for 2 hours and transferred for another 2 hours to ambient room temperature conditions.

The results of 6 rinsed and 12 unrinsed discs are summarized below in Table III.

TABLE III

| Carrier Distress Time, secs. | | % Passed, 2 secs. per side | | % Passed, 2 milli- seconds/second | |
|---|---|---|---|---|---|
| Rinsed | Un- rinsed | Rinsed | Un- rinsed | Rinsed | Un- rinsed |
| 3.1 | 122 | 45 | 0 | 91 | 0 |

No difference between rinsed and unrinsed discs was noted in wear testing whereby one 20 minute band is played 100 times.

EXAMPLE 2

Video discs were compression molded as in Example 1 using a molding composition containing 74.75 parts of PVC 346 resin, 15.0 parts of Ketjenblack EC, 2.0 parts of Mark 275, 0.75 part of Q232B, 0.5 part Loxiol G-30, 0.35 part of Loxiol G-70, and 4.0 parts of G-62.

A portion of the discs were tested as molded, a portion rinsed with water and a portion rinsed with a 5 percent aqueous solution of organic alcohols commercially available as 1160B conditioner from the Shipley Company which contains as its principal ingredients about 96.2 mol percent of Lubrol, an alcohol available from ICI Organics, Inc. having the formula

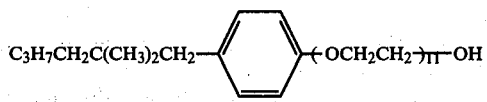

about 3.8 mol percent of 1,2-propanediol and a minor amount of triisopropanolamine.

All of the discs were sprayed with the lubricant of Example 1 prior to playback testing.

On initial playback, 96.5 percent of the discs had a carrier distress time of less than 2 seconds per side.

After the high humidity, high temperature condensation stress test described in Example 1, none of the unrinsed discs had a carrier distress time of less than 2 seconds, the variation being from 12 to 995 seconds.

For discs that were water rinsed, 78 percent of the discs passed the high humidity, high temperature stress test, the average being 1.4 seconds of carrier distress time per side.

For discs that were Shipley 1160 rinsed, 100 percent of the discs passed the high temperature, high humidity stress test with an average of only 0.4 second of carrier distress time per side.

EXAMPLE 3

Video discs were compression molded as in Example 1 using a molding composition containing 75.0 parts of PVC, 15.0 parts of Ketjenblack EC, 1.5 parts of T-35, 1.0 part of Mark 275, 0.5 part of Loxiol G-30, 0.25 part of Loxiol G-70, 2.0 parts of K-147 and 3.0 parts of di-undecyl phthalate commercially available from the Monsanto Company.

A portion of the discs were tested as molded, a portion rinsed with a 5 percent aqueous solution of Shipley 1160 and a portion rinsed with a 1 percent hydrochloric acid solution. All of the discs were sprayed with the lubricant of Example 1 prior to playback testing. The data are summarized below in Table IV.

TABLE IV

| Aqueous Solution | Carrier Distress Time, median secs. |
|---|---|
| 1% hydrochloric acid (HCl) | 0.3 |
| 5% Shipley 1160 | 0.7 |

The high temperature, high humidity stress test was repeated several times and the results of carrier distress noted after each stress test. The results are given below in Table V.

TABLE V

| Aqueous Solution | Carrier Distress, median secs. | | | | |
|---|---|---|---|---|---|
| | Test 1 | Test 2 | Test 3 | Test 4 | Test 5 |
| 1% HCl | 0.25 | 0.2 | 0.4 | 0.4 | 0.25 |
| 5% Shipley 1160 | 0.2 | 0.1 | 2.7 | 0.4 | 0.7 |

EXAMPLE 4

A molding composition was prepared from 75.45 parts of PVC 346 resin, 15.0 parts of Ketjenblack EC, 1.5 parts of T-35, 1.0 part of Mark 275, 1.0 part of Q232B, 0.5 part of Loxiol G-30, 0.25 part of Loxiol G-70, 0.3 part of calcium stearate, 2 parts of K-147, 1.0 part of G-62 and 2.0 parts of Santicizer 711.

A portion of the discs were rinsed with a 5 percent aqueous solution of Shipley 1160 and lubricated as in Example 1.

On initial playback, all of the discs passed the 2 second carrier distress time test.

The discs were stored for 8–10 months and then stressed using the high temperature, high humidity stress test. The carrier distress was still excellent, the average being 0.9 second and 100 percent of them were less than 2 seconds.

A control group of unrinsed discs had an average carrier distress of 15.9 seconds after high humidity, high temperature stressing.

We claim:

1. In the manufacture of a conductive video disc having video and audio information in the form of geometric variations in an information track which can be reconstituted in electrical signal form with a playback stylus, wherein a conductive plastic material is compression molded to form said video disc and said information track, the improvement which comprises as an integral part of said manufacture cleaning said disc with an aqueous solution to remove water soluble salts that cause carrier distress from the surface of said disc, thereby stabilizing the disc surface to exposure to elevated temperatures and high relative humidity.

2. A process according to claim 1 wherein a lubricant having the formula

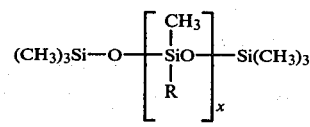

wherein R is an alkyl group of 4–20 carbon atoms and x is an integer, is applied to the washed surface.

3. A process according to claim 1 wherein the aqueous solution is deionized water.

4. A process according to claim 1 wherein the aqueous solution is a dilute hydrochloric acid solution.

5. A process according to claim 1 wherein the aqueous solution is a solution of organic alcohols.

6. A process according to claim 5 wherein said alcohols have the formula

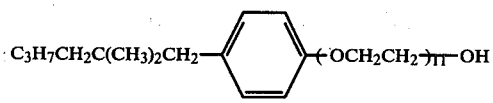

and

$CH_3CHOHCH_2OH$.

7. In the method of fabricating a video disc replica which comprises dry blending a polyvinylchloride resin with additives including stabilizers, lubricants and flow modifiers, molding to form a video disc replica and applying a thin lubricant layer to the disc surface, the improvement which comprises after molding, as an integral part of the fabrication cleaning the disc replica with a water-based solution to remove water soluble salts that cause carrier distress from the surface of the disc, thereby stabilizing the disc surface to exposure to elevated temperatures and high relative humidity prior to lubrication.

8. A method according to claim 7 wherein the additives include at least 12 percent by weight of the molding composition of conductive carbon black particles.

9. A method according to claim 8 wherein the water-based solution is dilute hydrochloric acid solution.

10. A method according to claim 8 wherein the water-based solution is a solution of organic alcohols.

11. A method according to claim 7 wherein the lubricant layer consists essentially of a siloxane of the formula

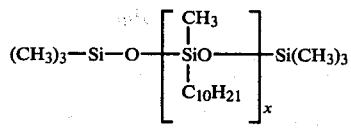

wherein x is about 2–3.

12. A video disc produced by the process of claim 1.
13. A video disc produced by the process of claim 2.
14. A video disc produced by the process of claim 7.
15. A video disc produced by the process of claim 11.

UNITED STATES PATENT AND TRADEMARK OFFICE
CERTIFICATE OF CORRECTION

PATENT NO. : 4,472,337
DATED : September 18, 1984
INVENTOR(S) : Robert H. Huck et al.

It is certified that error appears in the above-identified patent and that said Letters Patent is hereby corrected as shown below:

On the title page,
The title should read --PROCESS OF CLEANING VIDEO DISCS TO REMOVE SOLUBLE SALTS--.

At column 5, line 17, "74.05 part" should be --74.05 parts--.

Delete claims 12-15.

Signed and Sealed this

Twenty-sixth Day of February 1985

[SEAL]

Attest:

DONALD J. QUIGG

Attesting Officer

Acting Commissioner of Patents and Trademarks